(12) United States Patent
Pagot et al.

(10) Patent No.: US 6,494,040 B2
(45) Date of Patent: Dec. 17, 2002

(54) METHOD FOR MAKING A MASTER CYLINDER AND MASTER CYLINDER OBTAINED BY SAID METHOD

(75) Inventors: Henry Pagot, Villetaneuse (FR); Felix Masjuan, Barcelone (ES); Tomas Leon, Barcelone (ES)

(73) Assignee: Robert Bosch GmbH, Stuttgart (DE)

( * ) Notice: Subject to any disclaimer, the term of this patent is extended or adjusted under 35 U.S.C. 154(b) by 30 days.

(21) Appl. No.: 09/787,037

(22) PCT Filed: Jan. 29, 2001

(86) PCT No.: PCT/FR01/00294

§ 371 (c)(1),
(2), (4) Date: Mar. 13, 2001

(87) PCT Pub. No.: WO01/56852

PCT Pub. Date: Aug. 9, 2001

(65) Prior Publication Data

US 2002/0124564 A1 Sep. 12, 2002

(30) Foreign Application Priority Data

Feb. 2, 2000 (FR) .............................................. 00 01810

(51) Int. Cl.⁷ ................................................ B60T 11/20
(52) U.S. Cl. .......................................... 60/562; 60/589
(58) Field of Search .......................... 60/588, 589, 533, 60/562

(56) References Cited

U.S. PATENT DOCUMENTS 4,709,551 A * 12/1987 Saalbach et al. ............... 60/589
5,179,834 A * 1/1993 Rauschenbach ............... 60/589
5,499,225 A * 3/1996 Yoshimura .................... 60/589

* cited by examiner

Primary Examiner—Edward K. Look
Assistant Examiner—Thomas E. Lazo
(74) Attorney, Agent, or Firm—Leo H McCormick, Jr.; Warren Comstock (57) ABSTRACT

In a process for manufacturing a master cylinder (23) wherein a piston (9) that carries a valve (37) is assembled within a cylinder to define a chamber (41). The piston (9) moving in the chamber (9) in such a way that initial forward travel in cylinder defines a dead stroke as the valve (37) moves from an opened position to a closed position and with further forward travel with the valve (37) in the closed position defines a useful stroke wherein a lessening of an inner volume of the chamber (41) occurs as fluid is pressurized to effect a brake application, characterized in that the process further comprises the steps of:

a) installing a first adjusting part (51,55,57) between the valve (37) and piston (9);
b) measuring the dead stroke;
c) determining from the measurment of the dead stroke an effect that the geometry of the first adjusting part (51,55,57) has on the closure of the valve (37) during the initial forward travel of said piston (9);
d) comparing the measured dead stroke with a desired dead stroke for a master cylinder (23); and
e) replacing the first adjusting part (51,55,57) with a second adjusting part (51,55,57) to modify the closure of the valve (37) and alter said dead stroke when the measured dead stroke exceeds a predetermined value such thah the resulting dead stroke matches the desired dead stroke.

13 Claims, 10 Drawing Sheets

METHOD FOR MAKING A MASTER CYLINDER AND MASTER CYLINDER OBTAINED BY SAID METHOD

This invention mainly relates to a manufacturing process for a master cylinder, in particular a tandem master cylinder, such process including a dead-stroke adjusting step, and it also concerns a master cylinder manufactured using said process.

BACKGROUND OF THE INVENTION

It is quite usual to implement, in braking systems, valved tandem master cylinders which supply, on actuation, a high-pressure brake fluid for the control of the brakes associated with the wheels of a motor vehicle.

When a control rod is moved by means of a brake pedal, advantageously with the help of a pneumatic servomotor, it drives a push rod which, in turn, moves at least one piston of the tandem master cylinder and reduces the inner volume of a least one chamber filled with the brake fluid, the pressure of which is increased.

Yet, the initial travel, called the dead stroke, of the control rod by a few mm does not increase the pressure at all. In consequence, the braking operation is delayed by the dead stroke.

SUMMARY OF THE INVENTION

Therefore, it is an object of the present invention to provide a master cylinder, more particularly a valved master cylinder and, preferably, a tandem master cylinder which is reliable, rugged and capable of a fast response.

Another object of this invention consists in providing such as master cylinder, having a small dead stroke.

It is also an object of the present invention to provide batches of master cylinders exhibiting a very low dead-stroke dispersion.

Still another object of this invention consists in providing such a master cylinder, introducing only very little differences or modifications in comparison with the master cylinder of the well-known type, so as to facilitate its development.

And another object of the present invention consists in providing a tandem master cylinder at a moderate cost price.

These objects are achieved by a master cylinder, advantageously a tandem master cylinder according to this invention, comprising at least one translatably-mounted piston within a cylinder fitted with a valve, including a stroke-adjusting part in order to obtain a desired dead stroke, preferably a dead stroke falling within a range of values for the desired dead stroke.

A manufacturing process for such a master cylinder in accordance with the invention comprises a step of measuring the dead stroke of the valve, followed by a step of mounting, in the master cylinder, a stroke-adjusting part, ensuring a stroke compensation so as to obtain a dead stroke falling within a range of values for the desired dead stroke.

In an advantageous manner, a single measurement is carried out and a single selection of the adjusting parts is adopted, which are valid for a whole batch of master cylinders to be manufactured.

The main subject of the invention relates to a manufacturing process for a valved master cylinder, comprising the steps of assembling a master cylinder, having a piston moving in a chamber, and fitted with a valve, in such a way that the forward travel of the piston in the chamber corresponds, in the first instance, to a dead stroke, the valve being open, followed by a useful stroke accompanied by a lessening of the inner volume of the chamber, while the valve is closed, characterised in that if further comprises the steps of:

a) measuring the dead stroke;

b) determining, from the measurement of the dead stroke, the geometry of an adjusting part, ensuring the opening control of the valve during the forward travel of the piston, so as to obtain a desired dead stroke; and c) mounting, in the master cylinder, the adjusting part for the opening control of the valve, in order to alter, in particular reduce, the dead stroke of the master cylinder.

According with another aspect of the present invention, the manufacturing process is characterised in that said adjusting part is selected from a group of similar parts, having a plurality of geometries, each of them being associated, for a given master cylinder, with a different dead stroke.

The invention also relates to a process, characterised in that, subsequently to said determining step b concerning the geometry of an adjusting part, it comprises a step of manufacturing said adjusting part, having the geometry as determined in step b.

Another subject matter still of the present invention is a process, characterised in that the manufacturing of the adjusting part comprises a step of forming said part.

A process according to another aspect of this invention is characterised in that the adjusting part is a pin for receiving the end of a stem of a valve, and in that the determination of the geometry of the pin consists in determining its diameter in the contact area with the valve stem.

The invention also deals with a process, characterised in that the adjusting part is a ring having a bearing shoulder for the pin and in that the determination of the geometry of said ring consists in determining the shoulder thickness.

Another subject matter of this invention is a process, characterised in that the master cylinder to be manufactured, and the dead stroke of which must be adjusted, is a tandem master cylinder comprising a primary circuit and a secondary circuit, and in that the adjustment of the dead strokes is carried out both at the primary circuit and at the secondary circuit.

In accordance with the present invention, a process is characterised in that said process is a manufacturing process for a batch of master cylinders, and in that it comprises a single determining step, on the basis of the measurement of the geometry of an adjusting part, followed by the mounting, in succession, in a plurality of valved master cylinders, of adjusting parts the geometries of which correspond to that determined in the course of said single determining step.

The invention also deals with a valved master cylinder with a reduced dead stroke, characterised in that it is manufactured using a process according to this invention.

In accordance with another aspect of the present invention, a master cylinder comprises a piston moving in a chamber, and fitted with a valve, in such a way that the forward travel of the piston in the chamber corresponds, in the first instance, to a dead stroke, the valve being open, followed by a useful stroke accompanied by a lessening of the inner volume of the chamber, while the valve is closed, and the valve being fitted with a stem, an end of which rests on a pin, characterised in that it comprises a shouldered ring for the adjustment, at rest, of the position of the pin which determines the dead stroke of said master cylinder.

Other features and advantages of the present invention will be apparent from the following detailed description, by way of exempla and by no means as a limitation, when taken in conjunction with the accompanying drawings.

DETAILED DESCRIPTION OF THE INVENTION

In FIGS. 1 through 11, the same reference numerals will designate the same elements.

Figure 1:
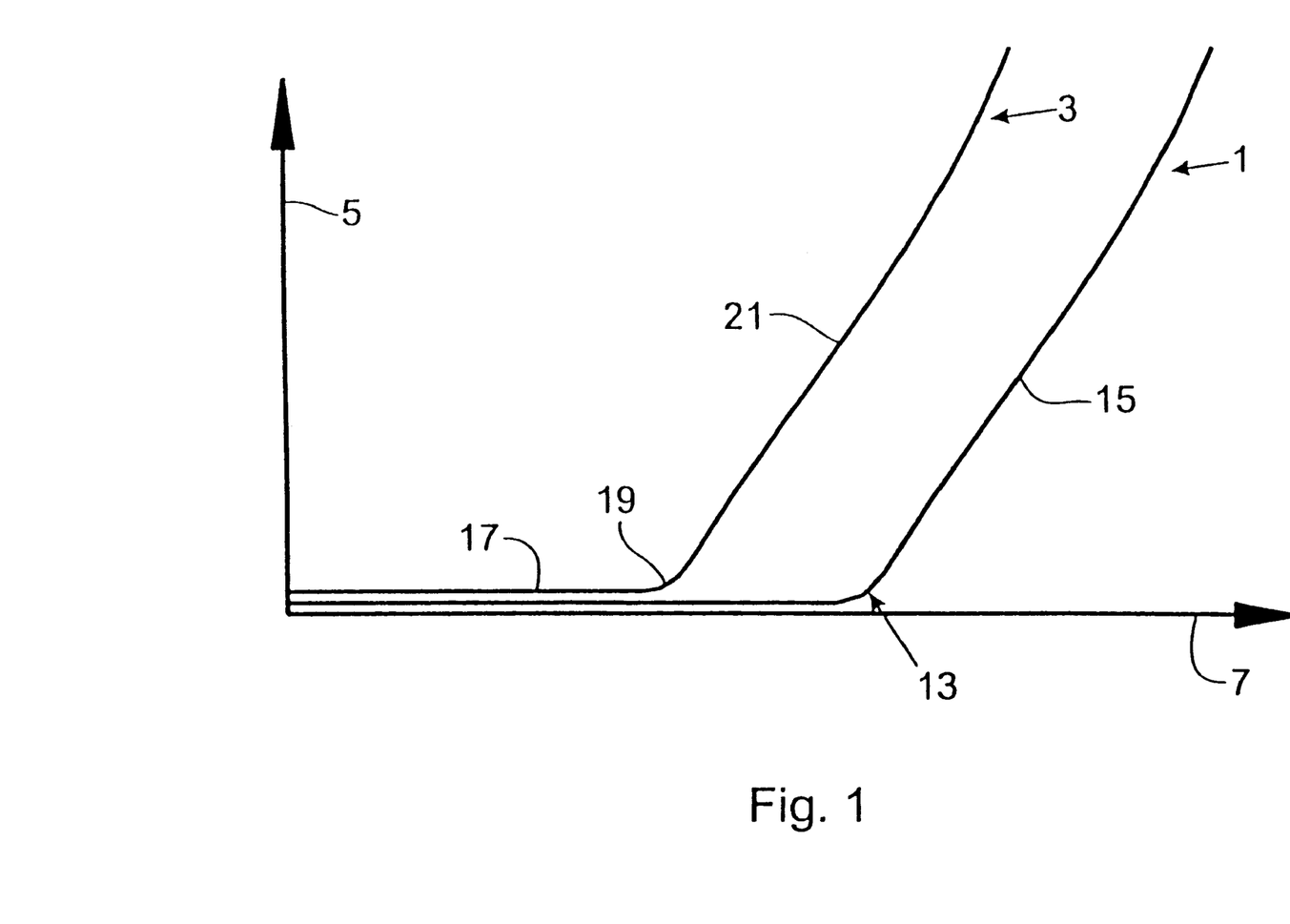
FIG. 1 is a graph showing the pressure, generated by a master cylinder according to an embodiment of the present invention, as a function of the piston strokes.
Figure 2:
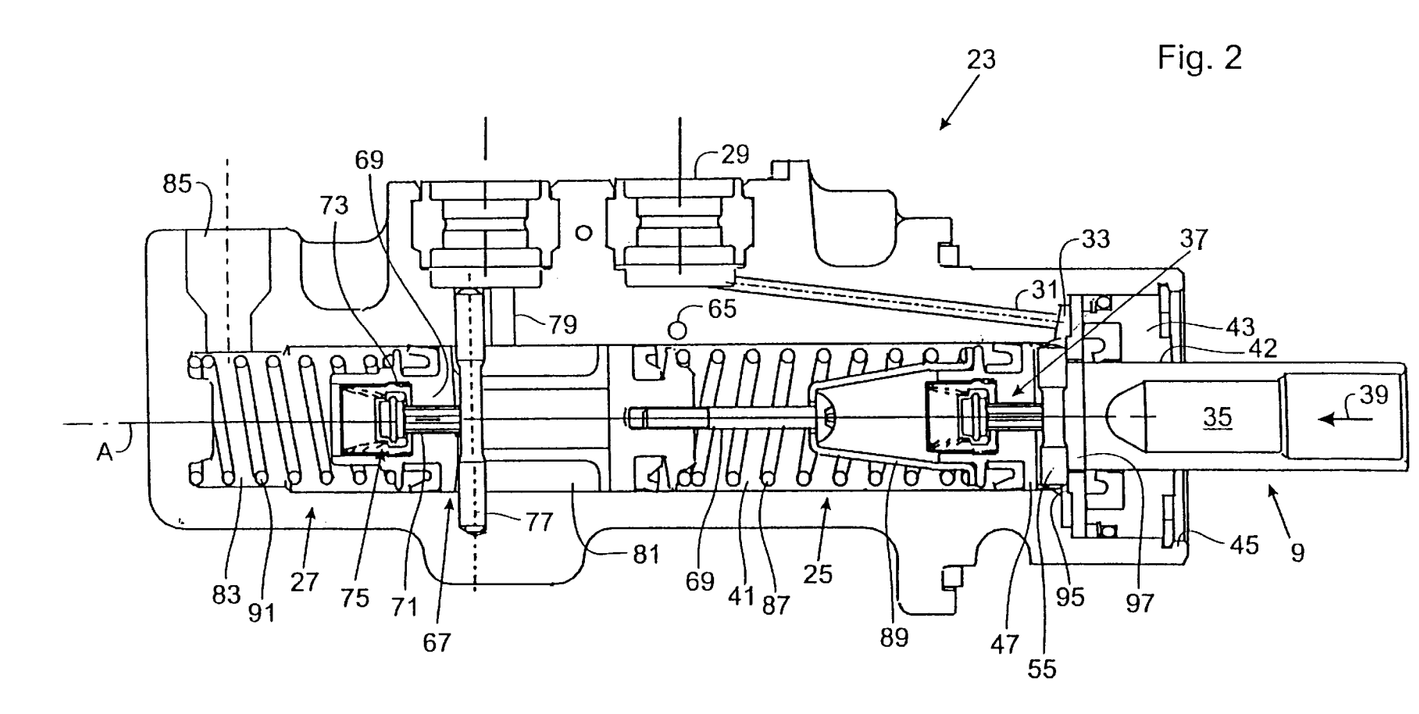
FIG. 2 is a longitudinal sectional view of the preferred embodiment of a tandem master cylinder according to the present invention.

FIG. 1 shows a first curve 1 and a second curve 3, representing the pressure 5 generated, respectively, by a primary circuit and a secondary circuit, as a function of the travel 7 of a push rod driving a primary piston 9 (FIG. 2).

Curve 1 begins with a horizontal plateau 11, corresponding to a pressure substantially equal to 50 Pa, up to an inflection point 13 followed by an area 15 in which the pressure 5 increases with the travel 7. The abscissa of point 13 determines the dead stroke of the primary circuit, advantageously ranging from 0.1 to 3 mm, preferably from 0.5 to 1.8 mm, and still better ranging from 0.5±0.2 mm to 1.5±0.2 mm.

Curve 3 begins with a horizontal plateau 17, corresponding to a pressure e.g. in the order of 100 Pa, up to an inflection point 19 followed by an area 21 in which the pressure 5 increases with the travel 7. The abscissa of point 19 corresponds to the dead stroke of the secondary circuit of the master cylinder. Such dead stroke of the secondary circuit ranges, for instance, from 0.1 to 2 mm, and advantageously from 0.5±0.2 mm to 1.3±0.2 mm. The minimum value, which is a non-null one, of the dead stroke permits the resupply of the master cylinder chamber with a brake fluid, more particularly when the braking system includes electronic systems preventing the wheels from being blocked (antiblocking systems/ABS). Moreover, there is an attempt at reducing the dead stroke in order to avoid too great a pedal travel and an unnecessary lengthening of the time between the moment when the driver depresses the pedal and the moment when the hydraulic pressure is actually applied to the brake actuators, arranged in the wheels.

FIG. 2 shows the preferred embodiment of a tandem master cylinder 23 according to the present invention, comprising a primary circuit 25 and a secondary circuit 27. The primary circuit 25 includes means 29 for the connection to a brake fluid tank (not shown), connected by a supply passage 31 with a supply chamber 33. The primary piston 9 comprises means 35 for the coupling with a push rod (not shown), typically a receiving cavity for the end of said push rod.

In a well-known manner, the push rod is rigidly locked with a control rod, driven by the brake pedal. In an advantageous manner, the travels of the push rod are assisted by a pneumatic servomotor of a known type. A valved master cylinder comprises a valve 37, which sealingly isolates a primary chamber 41 from the supply chamber 33, when the piston 9 moves forward in the direction of the arrow 39.

Figure 3:
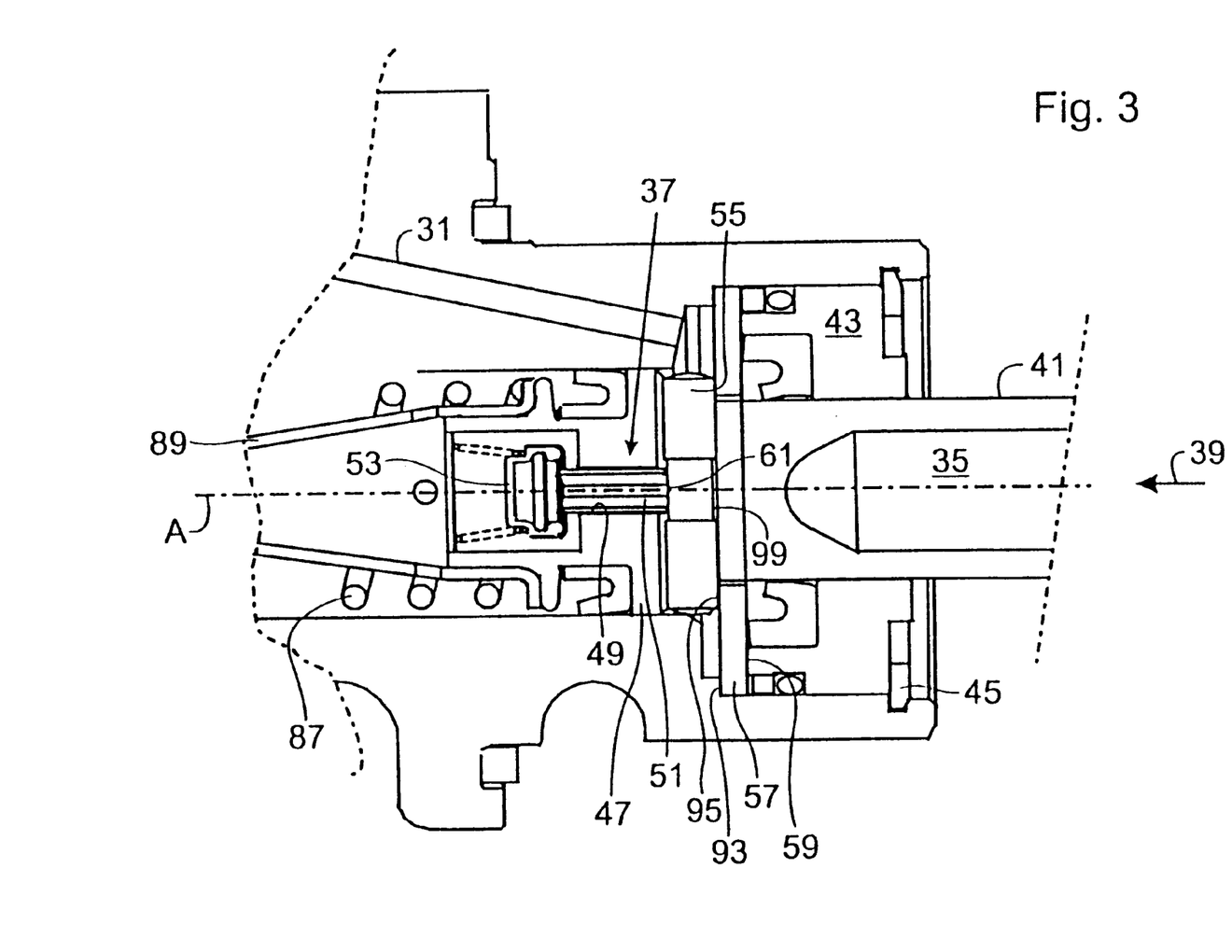
FIG. 3 is an enlarged similar view, showing a detail of the master cylinder of FIG. 2.
Figure 4:
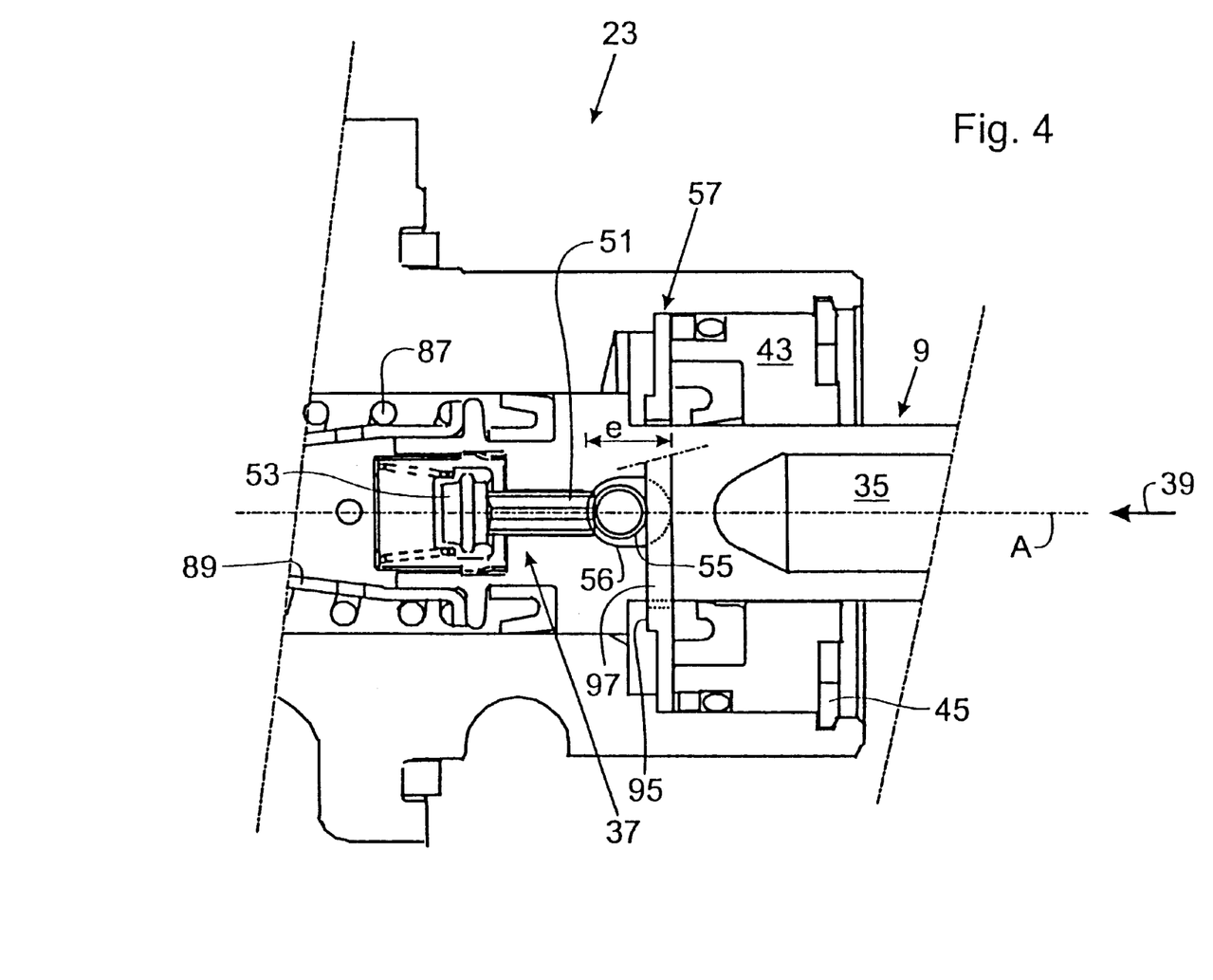
FIG. 4 is a longitudinal sectional view of the detail of FIG. 3, in a perpendicular plane to the sectional plane of FIG. 3.

In the preferred embodiment as shown, the primary piston 9 comprises a rod 42, guided by a guiding ring 43, mounted by means of a snap ring 45 on the body of the master cylinder 23. The rod 42 carries a transverse wall 47, closing the primary chamber 41. A bore 49, accommodating a stem 51, which connects a valve head 53 with a support element 55, extends through the wall 47. In the preferred embodiment, the element 55 is a pin retained by a washer or a ring 57, which is itself retained by the guiding ring 43. The transverse pin 55 is arranged at right angles to an axis A of the master cylinder 23 according to this invention, in a port 56 made in the primary piston 9 and the longitudinal extent e of which is greater than or equal to the dead stroke of the primary circuit. It should be noted that the position of the rear surface 59 of the ring 57 is predetermined by the length of the guiding ring 43 as well as by the location of the receiving cavity for the snap ring 45.

The cross-section of the bore 49 is larger than that of the stem 51, so as to provide a brake-fluid passage, when the valve 37 is open, between the supply chamber 33 and the primary chamber 41. The open position is obtained when one end 61 of the stem 51, in the opposite direction to the head 53, bears on the support element 55, more particularly on the pin.

On braking, the push rod causes the primary piston 9 to move forward in the direction of the arrow 39. In the first instance, this travel corresponds to the dead stroke, during which the valve 37 is open till the rear surface 61 of the head 53 of the valve 37 comes into contact with the front surface 63 of the wall 47 of the primary piston 9. The closure of the valve sealingly isolates the primary chamber 41 from the supply chamber 33 and, as a result, from the brake fluid tank, such fluid not being under the pressure generated by the master cylinder. In the second instance, the forward travel of the primary piston reduces the volume of the primary chamber 41 and, therefore, there is a brake-fluid pressure rise in it, and the pressurized brake fluid is supplied, through an opening 65, to the brake actuators associated with the vehicle wheels.

In a similar way, the secondary piston 67 comprises a transverse wall 69, provided with a bore 71, which receives a stem 73 of a valve 75, similar to the valve 37 of the primary piston 9. The end of the stem 73, in the opposite direction to that fitted with the head, rests on a transverse pin 77. A supply passage 79 connects a brake-fluid tank to a supply chamber 81 for the secondary cylinder, arranged between the primary chamber 41 and the secondary chamber 83. On braking, a branch connection 85 supplies the secondary braking circuit with the pressurized brake fluid.

The primary chamber 41 is fitted with a compression spring 87, the first end of which bears on the rear surface of the secondary piston 67 while its opposite end rests on a spring stop 89, interlocking with the front surface of the primary piston 9. The spring stop 89 is connected to the secondary piston by means of the adjusting screw 69 under a tensile load. The secondary chamber 27 is fitted with a return compression spring 91, the first end of which bears on the inner surface of the front wall of the body of the master cylinder 23, inside the secondary chamber 83, while its opposite end rests on the front surface of the secondary piston 67. The prestressing of the spring 87 is slightly higher than that of the spring 91.

On braking, the push rod (not shown) makes the primary piston 9 move forward in the direction of the arrow 39. During this initial travel of the piston 9, the pin 55 is not driven in the direction of the arrow 39. At first, the primary piston 9 covers the dead stroke and, then, when the rear surface 61 of the head 53 of the valve 37 comes to bear on the front surface 63 of the primary piston 9, the valve 37 is closed. The travel of the primary piston 9 brings about a low compression of the brake fluid in the chamber 41. The inner pressure rise in the chamber 41 as well as the prestress of the spring 87 make the secondary piston 67 move forward. Since the pin 77 stands still in its hole, the piston 67 initially covers the dead stroke and, then, when the front surface of the piston 67, constituting the seat of the valve 75, comes into contact with the rear surface of such valve head, a pressure rise takes place in the secondary circuit. From that time onwards, the secondary piston 67 makes resistance to the forward travel, which results in a volume reduction of the primary chamber 41 and, in consequence of it, in a pressure rise of the brake fluid, supplied to the primary circuit through the opening 65. In the same way, the secondary circuit is supplied with the pressurized brake fluid by means of the branch connection 85.

The adjustment of the dead strokes of the primary circuit and/or secondary circuit according to the invention makes it possible to improve quite noticeably the performance of a master cylinder and, more particularly, a tandem master cylinder in accordance with the invention, such adjustment corresponding to the reaching of the desired value of the distance which the adjusted piston must cover between a rest position and the closure of the associated valve.

In a first embodiment, the adjustment is carried out by adjusting the rest position (open valve) of the stem 51 or 71 of the valve (or any spacing means between the valve head and the valve seat). In the illustrated example, it is the point of contact between the pin 55 or 77 and the stem 51 or 71 of the valve 37 or 75 which is adjusted to the desired value. Such type of adjustment may be executed by adjusting the length of the valve stem and/or adjusting either the diameter or the thickness of the pin at the point of contact with the valve stem. Adjusting the pin diameter is particularly advantageous as regards the adjustment of the secondary circuit, insofar as the pin may be exchanged after the assembly of the tandem master cylinder according to the present invention.

The second embodiment, particularly suitable for the adjustment of the dead stroke of the primary piston valve, deals with the positioning of the pin and, more especially, with the locating of its point of contact with the desired stem end. In an advantageous manner, such positioning is carried out by a shouldered washer 57. As a matter of fact, the rear surface 59 of the washer 57 is accurately positioned by the guiding ring 43, retained by the snap ring 45. The radially-outer area 93 of the front surface of the ring 57 bears on a shoulder on the body of the tandem master cylinder 23. On the other hand, the radially-inner area 95, bordering on the central opening 97, may be selected so as to position the pin for the desired adjustment.

Figure 5:
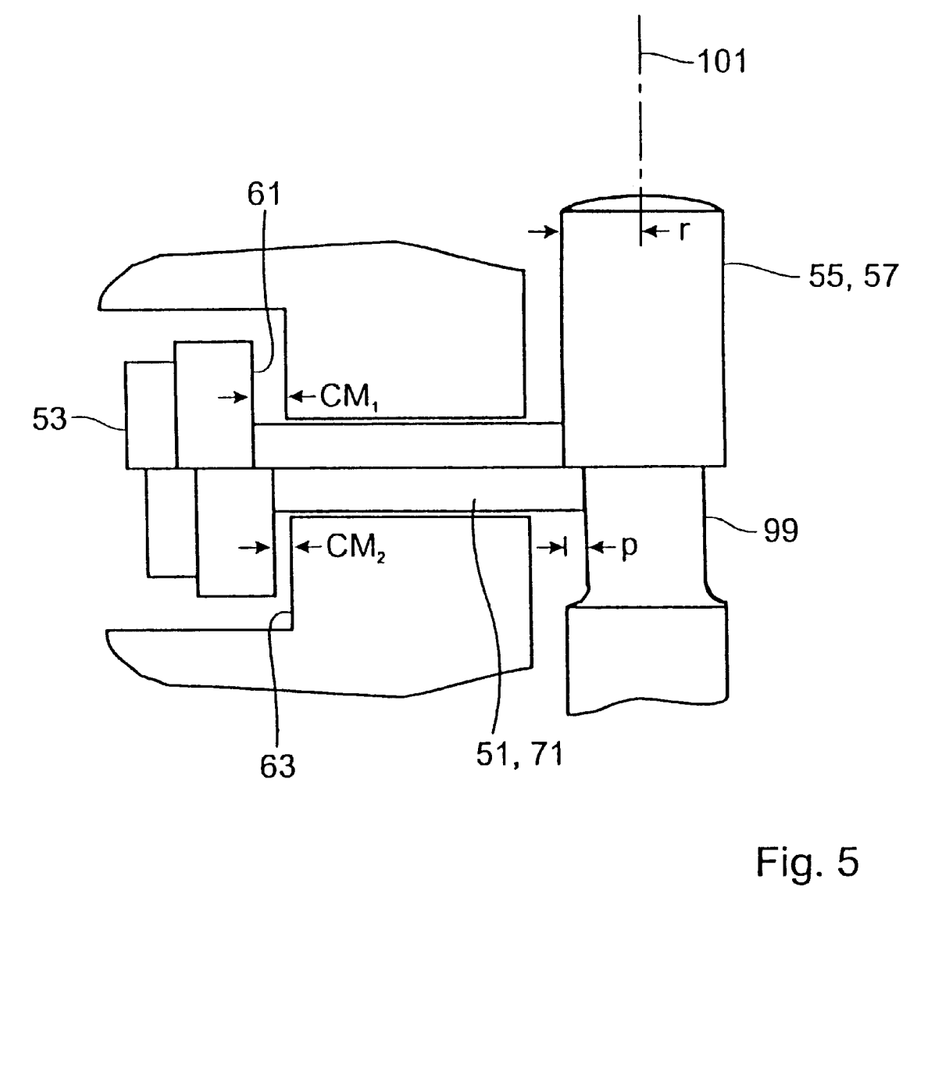
FIG. 5 is an explanatory diagram showing the influence exercised on the dead stroke by the contact area between the pin and the stem of a valve.
Figure 6:
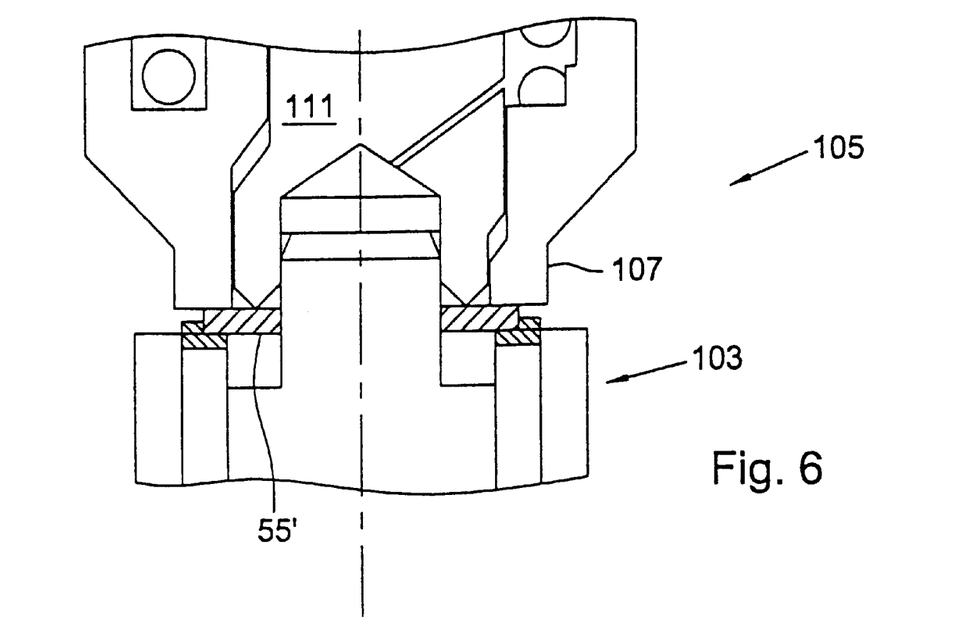
FIG. 6 is a sectional view of a tool, capable of being used in the process according to the present invention, in a first stage of the manufacturing step for an adjusting part.
Figure 7:
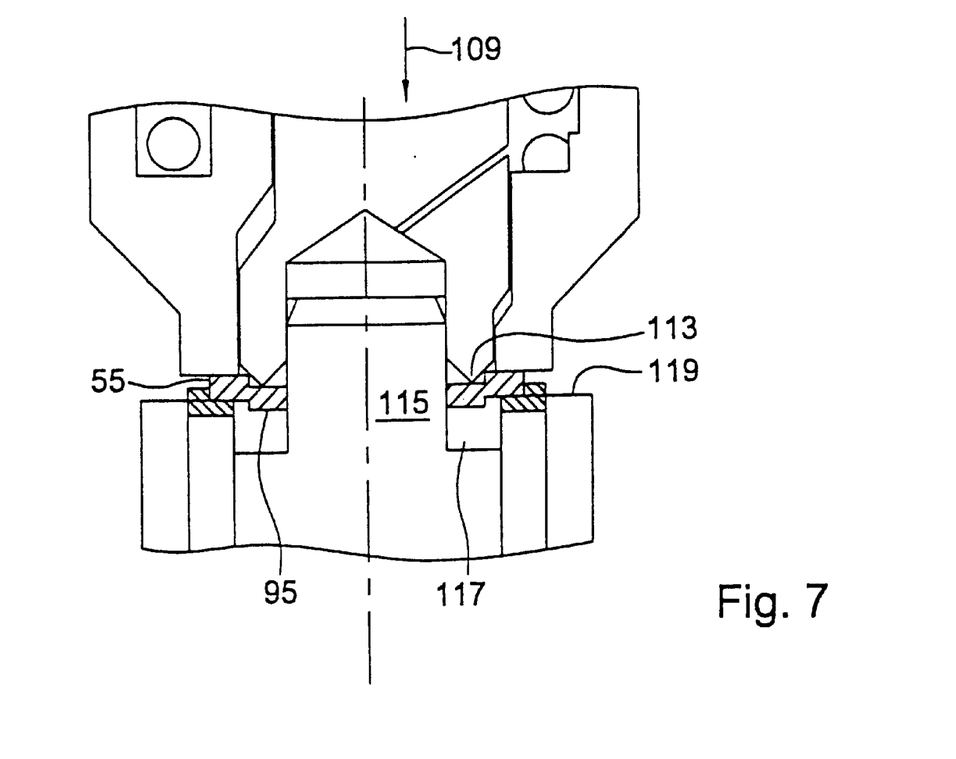
FIG. 7 is a similar view, during a second stage in which the adjusting part is being formed.

FIG. 5 shows said adjustment. The upper part of the figure shows a valve resting on a pin, the radius r of which matches a dead stroke $CM_1$. As represented in the lower part of FIG. 5, the stem 51 or 71 bears on a recessed area 99 of the pin, the radius r of which is reduced by a depth p corresponding to a dead stroke $CM_2$, equal to $CM_1$- p. Thus, without changing the position of the pin axis 101, and with only a minimum alteration in the master cylinder, the dead stroke value can be adjusted to a desired value within an allowance. Such adjustment may be continuously performed when parts are manufactured, which are perfectly well adapted for the corrections of the measured dead stroke, so as to obtain the desired dead stroke, or when a finite number of groups of parts with various dimensions are at one's disposal, in which case the part, belonging to the group, the dimensions of which are nearmost to those required for the desired dead stroke, shall be selected. The parts, capable of being turned into account for the adjustment, e.g. pins, stems or rings, may be machined or, preferably, formed. FIGS. 6 and 7 show the forming of a shouldered ring 57. If a non-null shoulder is desired, after the measurement as will be explained below by reference to FIGS. 8 through 11, first of all, a blank 55' is placed on an anvil 103 of a forming tool 105. In the illustrated example, the anvil 103 comprises a central guiding core 115, a cylindrical recess 117, for the deformation of the part 95 of the shouldered ring 55, and followed by a radially-outer retaining area 119. The blank 55' is gripped by a radially-outer jaw 107 facing the anvil 103, and then a radially-outer tool 111 is lowered in the direction of the arrow 109 and its contact area 113 with said part of the blank 55' deforms that part into the shape of a crown.

Figure 8:
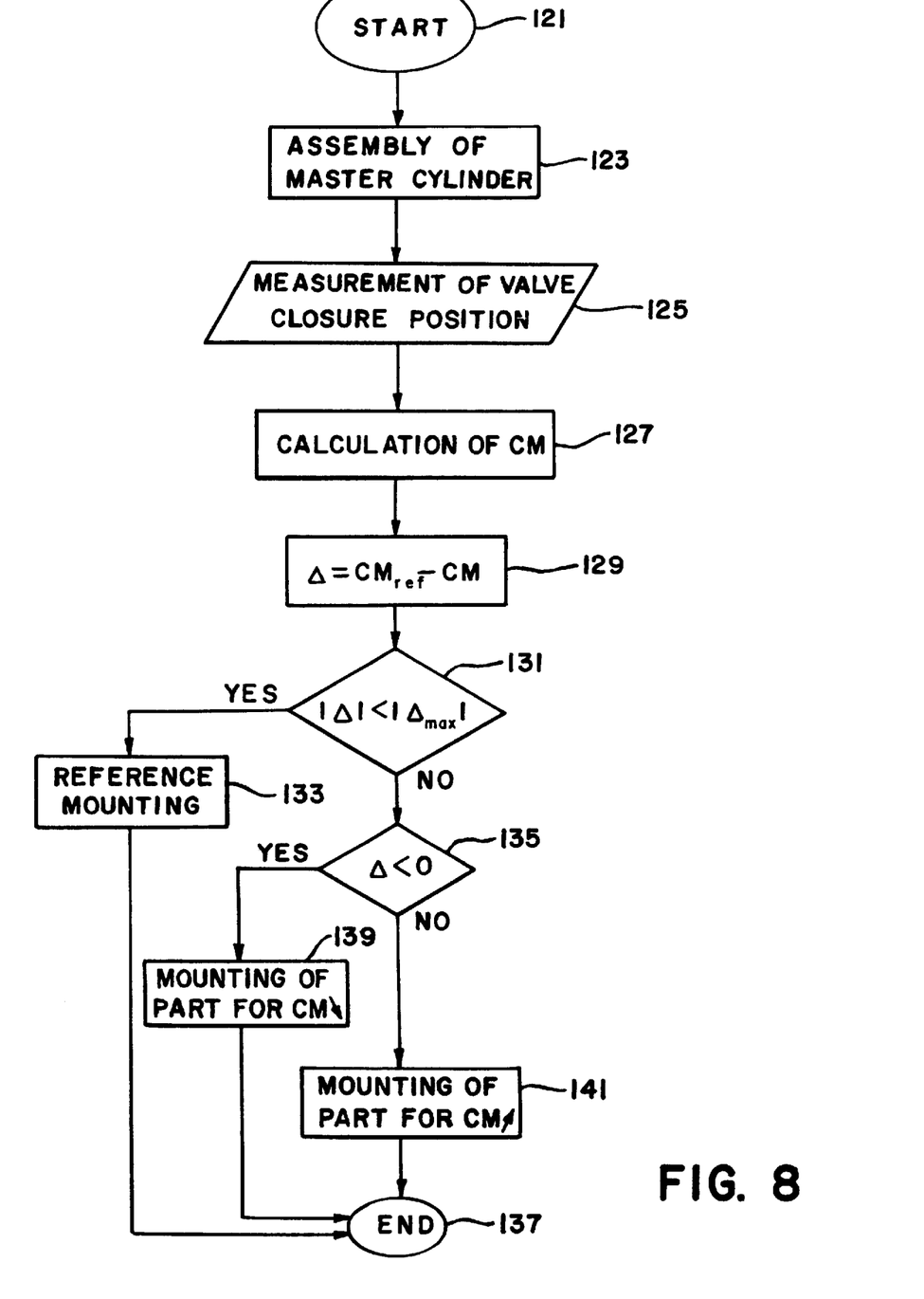
FIG. 8 is a flowchart showing a first implementation of an individual adjusting process for a master cylinder according to the present invention.
Figure 9:
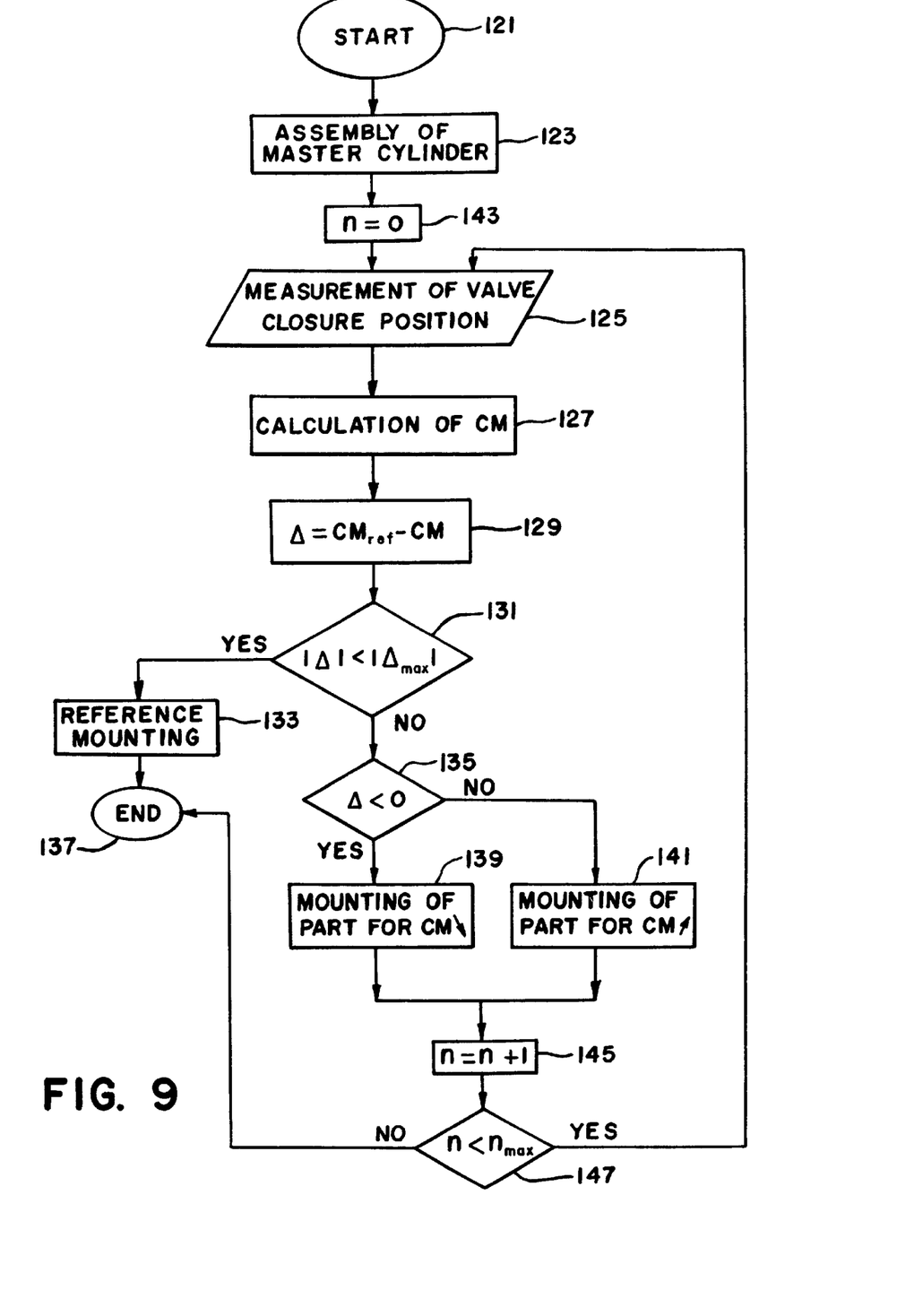
FIG. 9 is a flowchart showing a second implementation of a process according to the present invention, with an individual adjustment of a master cylinder.

Thanks to the process according to the invention, a desired value of the dead stroke can be reached by altering the characteristics of a specimen of master cylinders to be adjusted but, above all, the dead stroke value dispersion can be reduced to the minimum during mass production. By way of example, using a unit measurement, as shown in FIGS. 8 and 9, a dead stroke dispersion among various tandem master cylinders thus manufactured can be lower than 0.4 mm (i.e. ±0.2 mm). Such value can be further reduced in the case of a particularly careful batch production.

Figure 10:
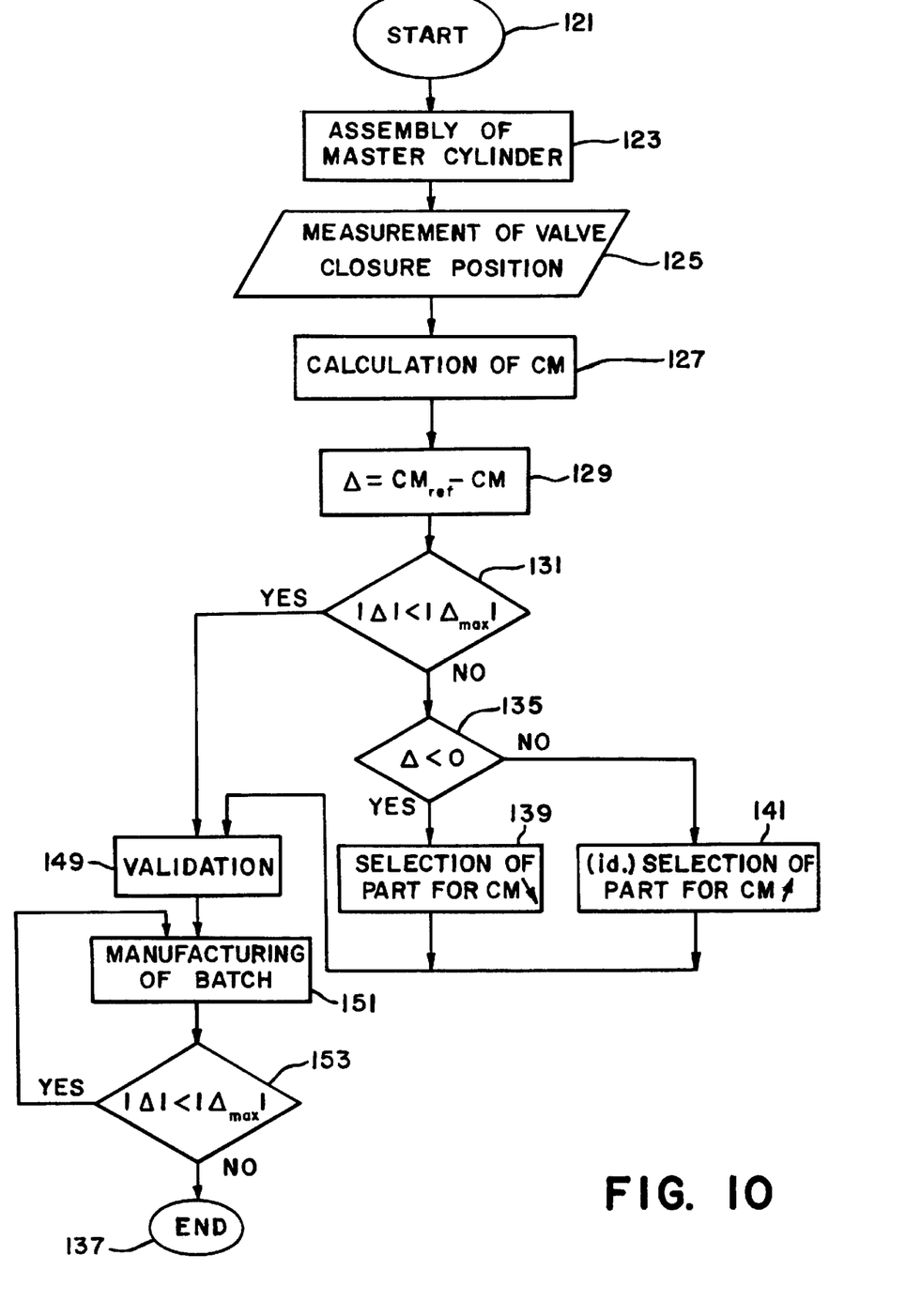
FIG. 10 is a flowchart showing a first implementation of a batchwise adjusting process for master cylinders according to the present invention.
Figure 11:
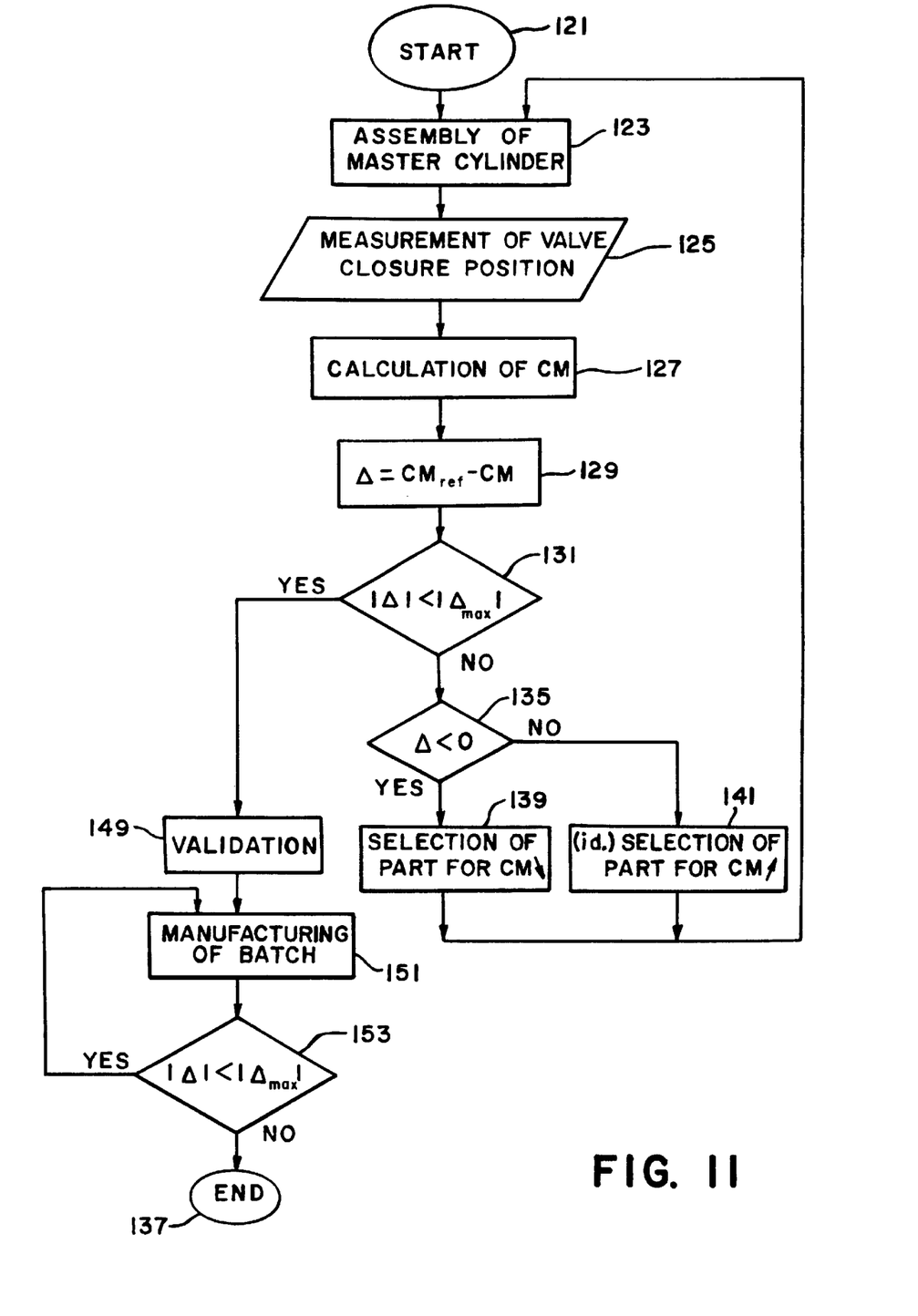
FIG. 11 is a flowchart showing a second implementation of a process according to the present invention, with a batchwise adjustment of master cylinders.

When an initial calibration is followed by the production of a batch of tandem master cylinders as illustrated in FIGS. 10 and 11, a dead stroke dispersion lower than 0.6 mm (i.e. ±0.3 mm) can be obtained.

FIG. 8 shows a procedure according to the present invention, in which an open-loop unit adjustment of each master cylinder is carried out.

The control starts at Step 121, followed by Step 123.

At Step 123, the master cylinder, in particular a tandem master cylinder to be adjusted, is assembled. In a first variant of the process in accordance with this invention, said assembly is performed using real parts. In an advantageous manner, when such assembly is carried out, the guiding ring 43 as well as the seal elements, such as cups and washers, are replaced by a one-piece part having the same shape and used as a measuring standard.

Then the control proceeds to Step 125.

At Step 125, the position, corresponding to the valve closure, is measured. Advantageously, such operation is performed under pneumatic conditions, which means that the master cylinder is filled with air. Yet, the implementation of hydraulic measurements using, e.g. a brake fluid, does not depart from the scope of this invention. The measurement is made, for instance, between either the outlet 29 of the tank or the inlet of the resupply passage 31, and the outlet 65. The primary piston 9 may be moved forward in the direction of the arrow 39 till a pressure difference is reached between the inlet of the resupply passage inlet 31 and the outlet 65.

The control goes to Step 127.

At Step 127, the hydraulic dead stroke is calculated, from the closure position of the valve, as measured at Step 125.

Then the control proceeds to Step 129.

At Step 129, the difference $\Delta$ between the desired dead stroke $CM_{ref}$ and the measured dead stroke CM is calculated.

The control goes to Step 131.

At Step 131, it is judged whether the absolute value of the difference between the desired dead stroke and the measured dead stroke is lower than the absolute value of the maximum allowable difference $\Delta_{max}$ (maximum allowable tolerance).

If a positive judgement is made, the control goes to Step 133 but, if a negative judgement is made, it proceeds to Step 135.

At Step 133, in the case of measurements using a reference standard element, a functional part, having the same geometry as the measure standard element, is mounted.

Steps 123 through 131 may also concern a secondary valve 75, if the dead stroke of the secondary circuit of a tandem master cylinder is to be adjusted as well.

The control jumps from Step 133 to Step 137, at which the manufacturing procedure with an adjustment according to this invention is terminated.

At Step 135, it is checked whether the difference $\Delta$ between the desired dead stroke and the measured dead stroke is negative.

If a positive judgement is made, the control goes to Step 139 but, if a negative judgement is made, it proceeds to Step 141.

At Step 139, at least one of the parts used for the adjustment and advantageously selected from a group consisting of the stem 51 of the valve 37, the pin 55 and the ring 57, is replaced by at least one part or a combination of those dead-stroke reducing parts. For instance, a shorter stem 51 is chosen, a pin 55 which has a smaller-diameter area 99, or a ring 57 with a thinner shoulder 95 is selected.

At Step 139, the adjustment of the dead stroke of the secondary valve of a tandem master cylinder may also be carried out.

At Step 141, the mounting of the functional parts ensuring, contrary to Step 139, a higher dead stroke is performed, e.g. by mounting a longer stem 51, a pin 55 having a greater diameter at its contact point with the stem 51, and/or a ring 57 with a thicker shoulder 95.

An adjustment of the dead stroke of the secondary circuit of a tandem master cylinder may also be carried out. The use of the pin 77, as an adjusting part, is particularly advantageous as regards the adjustment of the dead stroke of the secondary circuit. As a matter of fact, said pin is arranged in a hole enabling it to be changed even after the complete assembly of a tandem master cylinder 23.

After such a possible adjustment, the control goes to Step 137 and the manufacturing process according to the invention is terminated.

FIG. 9 shows an advantageous embodiment of a manufacturing procedure of a master cylinder according to the present invention, with a closed-loop adjustment of the dead stroke value(s). The procedure as per FIG. 9 differs from that shown in FIG. 8 in that, after Steps 139 and 141, the control goes back to Step 125 for a checking of all the alterations. If the measured values are not suitable, the loop may be gone through several times until the desired adjustment is reached (or, if none of the parts is fitting, up to the rejection of a master cylinder which does not meet the requirements). The selection of the adjusting parts at Step 139 or 141 may either be a simple incremental one (selection of the part exhibiting the smallest dead stroke difference compared with the previously tried part), or it can result from more sophisticated strategies, based on a preliminary statistical study, leading to the selection of the adjusting part which is the most likely to attain the desired compensation, so as to reduce the number of loop iterations to the minimum. A counter, comprising e.g. an initialisation step 143 prior to Step 125 and, in the loop, an incrementation step 145 and a comparison step 147 as regards a maximum value, advantageously avoids running through the loop indefinitely, when confronted with a defective part.

The unit adjustment of the parts according to FIGS. 8 and 9 is not always necessary, insofar as the mastery of industrial production makes it possible to manufacture similar parts, belonging to a batch of parts, which are manufactured in succession on the same machine.

The adjustment per production batch offers many advantages. First of all, an adjustment per master cylinder batch accelerates the operations, while suppressing the individual adjustments of master cylinders. Moreover, more thorough measures can be carried out, by sacrificing one or more master cylinders for the calibration of the batch. As a matter of fact, a test can be performed using various values of the adjusting parts, without it being necessary that the part, concerned by the measure, should be dismounted, the result of such operation being the determination or the extrapolation of the optimal values to be used for the next batch.

In the example illustrated in FIG. 10, the control starts at Step 121, followed by Step 123.

At Step 123, a master cylinder for adjustment purposes is assembled.

The control proceeds to Step 125.

At Step 125, the closure position(s), advantageously under pneumatic conditions, of the valve or, preferably, the valves is or are measured.

Then, the control goes to Step 127.

At Step 127, the dead stroke of the valve(s) is calculated.

Then the control proceeds to Step 129.

At Step 129, the difference $\Delta$ between the desired dead stroke $CM_{ref}$ and the measured dead stroke CM is calculated.

The control goes to Step 131.

At Step 131, it is judged whether the master cylinder fabricated in this way meets the desired tolerances.

If a positive judgement is made, the control goes to Step 149 but, if a negative judgement is made, it proceeds to Step 135.

At Step 149, the choice of the parts required for the manufacturing of the batch is validated, and the control proceeds to Step 151.

At Step 151, the batch of master cylinders, adjusted according to the present invention, is manufactured. In a first embodiment, the batch corresponds to a number of parts, e.g. the batch will include 300, 1000 or 5000 parts depending on the manufacturing process stability and, therefore, on the tolerance drift.

In a first variant, a batch corresponds to a given manufacturing time and not to a given number of resulting parts. In the advantageous variant as represented, a final inspection of every part or a sampling inspection will result either in the continuation or in the discontinuation of the manufacturing of the same batch, corresponding to the same selection of the dead-stroke adjusting parts.

In the illustrated example, the control proceeds from Step 151 to Step 153. At Step 153, a measure or a comparison is performed in order to check whether the dead stroke(s) is or are up to the desired tolerances.

If a positive judgement is made, the control goes back to Step 151 and the manufacturing operation for this batch continues.

If a negative judgement is made, the control goes to Step 137, which means that the production of this batch is stopped, possibly with a return to Step 121, for the calibration of a new batch of master cylinders to be manufactured.

At Step 135, it is checked whether the difference Δ between the desired dead stroke and the measured dead stroke is negative.

If a positive judgement is made, the control goes to Step 139 but, if a negative judgement is made, it proceeds to Step 141.

At Step 139, at least one of the parts used for the adjustment, and advantageously selected from a group consisting of the stem 51 of the valve 37, the pin 55 and the ring 57, is replaced by at least one part or a combination of those dead-stroke reducing parts. For instance, a shorter stem 51 is chosen, a pin 55 which has a smaller-diameter area 99, or a ring 57 with a thinner shoulder 95 is selected.

At Step 139, the adjustment of the dead stroke of the secondary valve of a tandem master cylinder may also be carried out.

Then the control proceeds to Step 149.

At Step 141, the mounting of the functional parts ensuring, contrary to Step 139, a higher dead stroke is performed, e.g. by mounting a longer stem 51, a pin 55 having a greater diameter at its contact point with the stem 51, and/or a ring 57 with a thicker shoulder 95.

An adjustment of the dead stroke of the secondary circuit of a tandem master cylinder may also be carried out. The use of the pin 77, as an adjusting part, is particularly advantageous as regards the adjustment of the dead stroke of the secondary circuit. As a matter of fact, said pin is arranged in a hole enabling it to be changed even after the complete assembly of a tandem master cylinder 23.

The control proceeds to Step 149.

FIG. 11 shows the preferred example of a manufacturing process with an adjustment according to the invention.

Such process differs from that shown in FIG. 10 in that a closed-loop control is performed, which means that, from Step 139 or 141, the procedure returns to Step 123 for a new assembly of a calibrating master cylinder for a batch production. It may be either the same master cylinder as previously used, but fitted with new dead-stroke adjusting parts, or a new cylinder for calibration purposes, till the desired tolerances are met (Step 131). The procedure shown in FIG. 11 permits a further reduction of the tolerances of the master cylinders manufactured according to the invention.

The present invention concerns, more particularly, the motor car industry.

And the present invention mainly applies to the design and manufacturing of braking systems for motor vehicles and, especially, for passenger cars.

We claim:

1. A process of manufacturing a master cylinder comprising the steps of assembling a piston that carries a valve within a bore of a cylinder to define a chamber, said piston being responsive to an input member for moving from a position of rest into said bore in such a way that initial forward travel of said piston defines a dead stroke as said valve moves from an open position to a closed position and with further movement into said bore with the valve in said closed position a lessening of an inner volume of said chamber occurs as fluid is pressurized to define a useful stroke, characterized in that the process further comprises the additional steps of:

a) measuring said dead stroke;
   b) comparing said measured dead stroke with a desired dead stroke; and
   c) locating an adjusting part between said valve and said piston when the measured dead stroke exceeds a predetermined value of said desired dead stroke to substantially match a resulting dead stroke with said desired dead stroke.

2. The process according to claim 1, characterized in that said adjusting part is selected from a group of similar parts, having a plurality of geometies, each providing a given master cylinder with a different dead stroke.

3. The process according to claim 1, characterized in that said adjusting part includes a pin for receiving an end of a stem of said valve, and in that a diameter of said pin defines a contact area for said end.

4. The process according to claim 3 characterized in that said adjusting part further inclues a ring having a bearing shoulder for said pin and in that said thicknes of said shoulder is a function of the dead stroke.

5. The process according to claim 1 characterized in that said master cylinder and dead stroke adjustment is a tandem master cylinder comprising a primary circuit and a secondary circuit, and in that the modification of the dead stroke is carried out for both the primary and secondary circuits.

6. The process according to claim 1, characterized in that comparing said measured dead stroke with a desired dead stroke and inserting an adjusting part to modify the dead stroke of a master cylinder forms a basis for the modification of a plurality of master cylinders.

7. A master cylinder manufactured according to the process of claim 1.

8. In a process for manufacturing a master cylinder wherein a piston that carries a valve is assembled within a cylinder to define a chamber, said piston moving in said chamber in such a way that initial forward travel in said cylinder defines a dead stroke as said valve moves from an opened position to a closed position and with further forward travel with the valve in said closed position defines a useful stroke wherein a lessening of an inner volume of the chamber occurs as fluid is pressurized in said chamber to effect a brake application, characterized in that said process further comprises the steps of:

a) installing a first adjusting part between said valve and said piston;
   b) measuring said dead stroke;
   c) determining from the measurment of said dead stroke an effect that the geometry of said first adjusting part has on the closure of said valve during the initial forward travel of said piston;

d) comparing the measured dead stroke with a desired dead stroke for a master cylinder; and e) replacing said first adjusting part with a second adjusting part to modify the closure of said valve and thereby alter said dead stroke when the measured dead stroke exceeds a predetermined value such that a resulting dead stroke substantially matches said desired dead stroke.

9. The process according to claim 8, characterized in that said first and second adjusting part are selected from a group of similar parts, having a plurality of geometeries, each of which will develop a different dead stroke for a master cylinder.

10. The process according to claim 8, characterized in that said first and second adjusting parts include a pin for receiving an end of a stem of said valve, and in that determining of the geometry of said pin consists of selecting its diameter as a contact area for said stem.

11. The process according to claim 10, characterized in that said first adjusting parts include a ring having a bearing shoulder for said pin and in that the determining of the geometry of said ring consists of selecting a shoulder thickness for said ring.

12. The process according to claim 8, characterized in that said master cylinder to be manufactured and said dead stroke to be adjusted is a tandem master cylinder comprising a primary circuit and a secondary circuit, and in that the modification of the closure of the valve is carried out in both the primary and secondary brake circuits.

13. The process according to claim 8, characterized in that said process of manufacturing is for a plurality of master cylinders as a result of said comparing the measured dead stroke with a desired dead stroke of a single master cylinder.

* * * * *